US012456302B2

(12) United States Patent
Funada et al.

(10) Patent No.: US 12,456,302 B2
(45) Date of Patent: Oct. 28, 2025

(54) CONVERSATION SURVEILLANCE APPARATUS, CONTROL METHOD, AND COMPUTER READABLE MEDIUM

(71) Applicant: NEC Corporation, Tokyo (JP)

(72) Inventors: Junichi Funada, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 18/014,942

(22) PCT Filed: Jul. 8, 2020

(86) PCT No.: PCT/JP2020/026713
§ 371 (c)(1),
(2) Date: Jan. 6, 2023

(87) PCT Pub. No.: WO2022/009339
PCT Pub. Date: Jan. 13, 2022

(65) Prior Publication Data
US 2023/0260286 A1    Aug. 17, 2023

(51) Int. Cl.
*G06V 20/52* (2022.01)
*G06V 20/40* (2022.01)
*G10L 25/57* (2013.01)

(52) U.S. Cl.
CPC .............. *G06V 20/53* (2022.01); *G06V 20/41* (2022.01); *G10L 25/57* (2013.01)

(58) Field of Classification Search
CPC ......... G10L 25/57; G06V 20/53; G06V 20/41
See application file for complete search history.

(56) References Cited

U.S. PATENT DOCUMENTS

2015/0213702 A1* 7/2015 Kimmel ................. G06V 20/52
382/103
2015/0290808 A1* 10/2015 Renkis ................. H04N 13/275
901/50
(Continued)

FOREIGN PATENT DOCUMENTS

JP    2017-514709 A    6/2017
WO   2015/173854 A1   11/2015
WO   2019/239813 A1   12/2019

OTHER PUBLICATIONS

International Search Report for PCT Application No. PCT/JP2020/026713, mailed on Oct. 13, 2020.
(Continued)

*Primary Examiner* — Casey L Kretzer
(74) *Attorney, Agent, or Firm* — Sughrue Mion, PLLC

(57) ABSTRACT

A conversation surveillance apparatus (2000) detects a plurality of persons (a human group (40)) who have a conversation within a predetermined distance in a surveillance area (10) from video data (32). The conversation surveillance apparatus (2000) determines the duration of the conversation held by the human group (40) and puts the determined duration of the conversation into a storage device in association with identification information of the human group (40). The conversation surveillance apparatus (2000) determines whether the total duration of the conversations held by the human group (40) within a predetermined period of time is equal to or larger than a threshold using the information stored in the storage device.

9 Claims, 7 Drawing Sheets

(56) References Cited

U.S. PATENT DOCUMENTS

| | | | |
|---|---|---|---|
| 2017/0083824 A1 | 3/2017 | Miyakoshi et al. | |
| 2017/0120446 A1 | 5/2017 | Veltrop et al. | |
| 2017/0339348 A1* | 11/2017 | Shimizu | H04N 23/69 |
| 2020/0394419 A1 | 12/2020 | Takayanagi | |

OTHER PUBLICATIONS

Kozaki, Yoji, "Debut of the Moving Pepper! Put into use for security patrols, preventing pickpocketing, detecting wandering at nursing homes". Robostar. In particular, "Overview of Patrol System" Jul. 20, 2018, pp. 1-6 URL:https://robotstart.info/2018/07/20/moving-pepper-sbw.html.

* cited by examiner

60

| GROUP IDENTIFICATION INFORMATION | TIME INFORMATION ||
| --- | --- | --- |
| | CONVERSATION START TIME | CONVERSATION DURATION |
| | | |

62 — Group Identification Information
64 — Time Information

Fig. 7

CONVERSATION SURVEILLANCE APPARATUS, CONTROL METHOD, AND COMPUTER READABLE MEDIUM

This application is a National Stage Entry of PCT/JP2020/026713 filed on Jul. 8, 2020, the contents of all of which are incorporated herein by reference, in their entirety.

TECHNICAL FIELD

The present invention relates to a technique for detecting conversation had by a plurality of persons.

BACKGROUND ART

From the perspective of preventing the spread of infectious diseases or the like, there are situations in which it is desirable that long conversations among people within a close distance of each other be avoided. Thus, systems for detecting a situation in which a long conversation is taking place among people at a close distance from each other have been developed. For example, Patent Literature 1 discloses a technique for detecting that a resident and a visitor have had a conversation with each other for a predetermined period of time or longer using images obtained from a camera installed in a facility and issuing a notification indicating that there is high risk of being infected with an infectious disease in response to the detection. Here, in Patent Literature 1, the state in which the people are facing each other at a close distance from each other is detected as being a state in which they are having a conversation. Further, even if they are temporarily not facing each other at a close distance from each other, if they face each other again after that, it is regarded that the conversation is continuing.

CITATION LIST

Patent Literature

[Patent Literature 1] International Patent Publication No. WO 2019/239813

SUMMARY OF INVENTION

Technical Problem

In the system disclosed in Patent Literature 1, a notification is issued when a time of a single conversation becomes equal to or longer than a predetermined period of time. However, a case in which conversation by a plurality of persons is considered to be undesirable is not limited to a case in which a single conversation lasts for a long time.

The present invention has been made in view of the aforementioned problem and one of the objectives is to provide a technique for more broadly detecting a situation in which a conversation is taking place.

Solution to Problem

A conversation surveillance apparatus according to the present disclosure includes: a recording unit configured to detect a plurality of persons who have a conversation within a predetermined distance in a surveillance area from video data, determine a duration of the conversation had by the plurality of persons, and put the determined duration of the conversation in association with identification information of the plurality of persons into a storage device; and a determination unit configured to determine whether or not a total duration of the conversations of the plurality of persons within a predetermined period of time is equal to or larger than a threshold using the information stored in the storage device.

A control method according to the present disclosure is executed by a computer. This control method includes: a recording step of detecting a plurality of persons who have a conversation within a predetermined distance in a surveillance area from video data, determining a duration of the conversation had by the plurality of persons, and putting the determined duration of the conversation in association with identification information of the plurality of persons into a storage device; and a determining step of determining whether or not a total duration of the conversations of the plurality of persons within a predetermined period of time is equal to or larger than a threshold using the information stored in the storage device.

A computer readable medium according to the present disclosure stores a program for causing a computer to execute a control method according to the present disclosure.

Advantageous Effects of Invention

According to the present invention, a technique for more broadly detecting a situation in which a conversation is taking place is provided.

BRIEF DESCRIPTION OF DRAWINGS

FIG. 7 is a diagram illustrating a configuration of conversation information in a form of a table.

EXAMPLE EMBODIMENT

Hereinafter, with reference to the drawings, example embodiments of the present disclosure will be described. Throughout the drawings, the same or corresponding components are denoted by the same reference symbols and overlapping descriptions will be omitted as necessary for the sake of clarification of the description.

Figure 1:
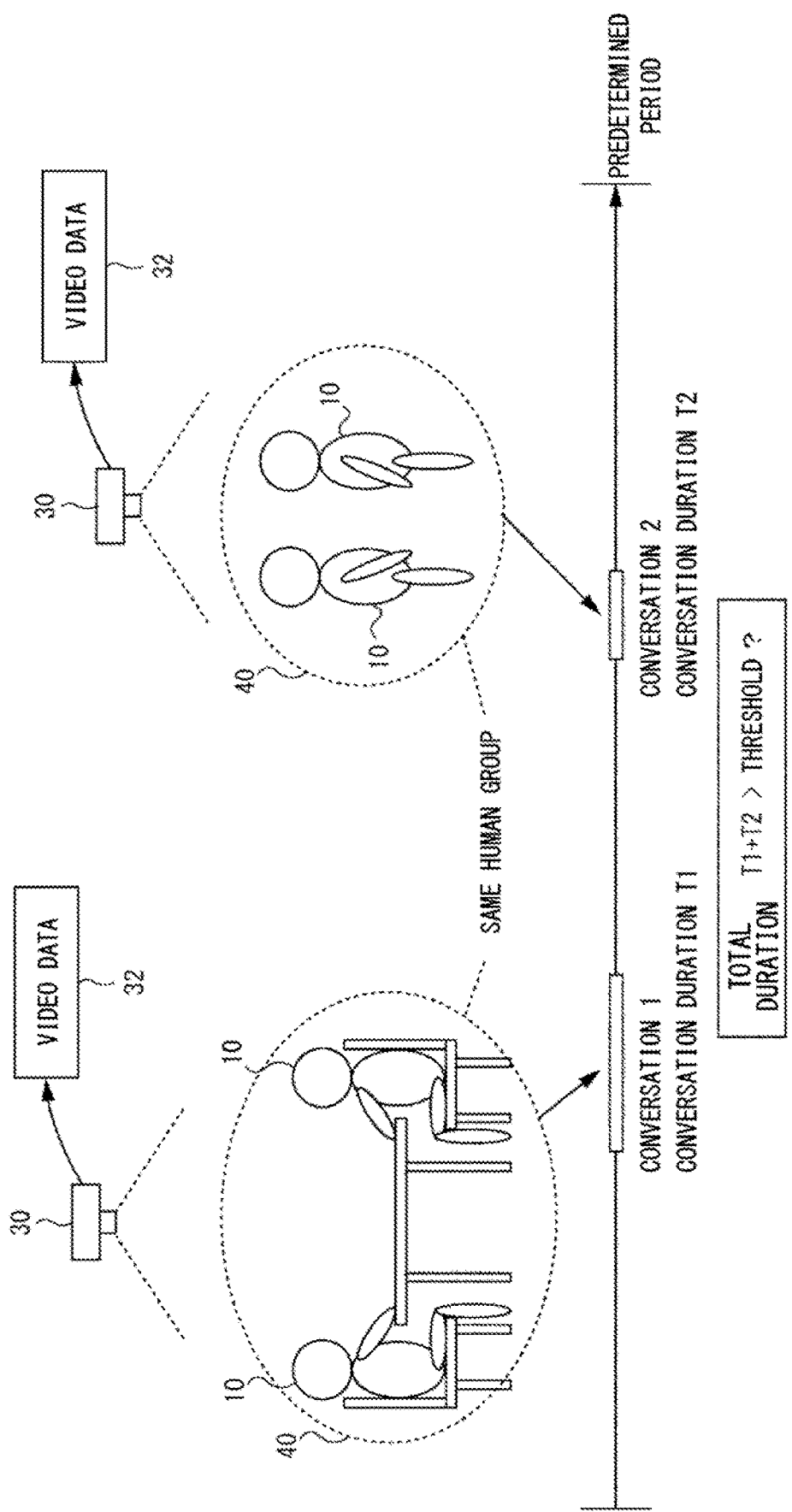
FIG. 1 is a diagram illustrating an overview of a conversation surveillance apparatus according to a first example embodiment.

FIG. 1 is a diagram illustrating an overview of a conversation surveillance apparatus (a conversation surveillance apparatus 2000 in FIG. 2 that will be described later) according to the first example embodiment. Note that the following description made with reference to FIG. 1 is a diagram for facilitating understanding of the conversation surveillance apparatus 2000 according to the first example embodiment, and operations of the conversation surveillance apparatus 2000 according to the first example embodiment are not limited to those described below.

The conversation surveillance apparatus 2000 analyzes video data 32 and thus detects a situation in which a plurality of persons 10 are having conversations within a predetermined distance L1. The video data 32 is generated by a camera 30 that captures images in a predetermined surveillance area. The surveillance area may be any place such as an office. Further, the surveillance area may be outdoors. Hereinafter, a group of the plurality of persons 10 detected to have a conversation within the predetermined distance L1 is referred to as a human group 40.

The camera 30 may be a camera fixed in a specific place (hereinafter it will be referred to as a fixed camera) or may be a camera that is provided in a mobile robot configured to move in a surveillance area (hereinafter it will be referred to as a moving camera). The fixed camera is, for example, a surveillance camera that is installed on the ceiling or a wall.

A plurality of the cameras 30 may be installed in the surveillance area. For example, a plurality of fixed cameras are installed in such a way that they capture images of different respective places included in the surveillance area. In another example, a plurality of moving cameras may be installed instead of installing the fixed cameras. In another example, one or more fixed cameras and one or more moving cameras may be installed. When the plurality of moving cameras are installed, a plurality of mobile robots that are provided with the moving cameras are installed in the surveillance area.

The conversation surveillance apparatus 2000 determines a conversation duration (time duration of the conversation) in the human group 40. Then, the conversation surveillance apparatus 2000 generates information (hereinafter, referred to as conversation information) indicating association between identification information of the human group 40 and the time duration of the conversation had among the human group 40 and stores the generated information in a storage device.

The conversation duration may be determined by analyzing the video data 32 or by using other data. In the latter case, for example, the conversation duration in the human group 40 is determined using video data obtained from the camera provided in the mobile robot or audio data obtained from a microphone provided in the mobile robot.

The conversation surveillance apparatus 2000 determines, for the human group 40, whether or not the total value of the conversation durations in the human group 40 within a predetermined period of time (e.g., the duration of the conversations had in the same day) is equal to or larger than a threshold using the conversation information. When it is determined that the total value of the conversation durations is equal to or larger than the threshold, the conversation surveillance apparatus 2000 performs a predetermined countermeasure process (e.g., a warning process for the human group 40).

Example of Advantageous Effects

From the perspective of preventing the spread of infectious diseases or the like, when a plurality of persons 10 are having conversations within a close distance, even if the conversation duration per each conversation is short, it is not preferable that the total duration of the conversations had in a specific period (e.g., the same day) be long. With regard to this point, with the conversation surveillance apparatus 2000 according to this example embodiment, the total duration of the conversations that the human group 40 has had within a predetermined distance and within a predetermined period of time such as "on the same day" is computed, and it is determined whether or not the total duration is equal to or larger than a threshold. Therefore, it is possible to detect, for the plurality of persons 10 located within a predetermined distance, not only a case in which a single conversation is long but also a case in which the total duration of the conversations had within a predetermined period of time is long. Therefore, it is possible to more broadly detect a case in which a conversation had by the plurality of persons 10 lasts for a long time.

Hereinafter, the conversation surveillance apparatus 2000 according to this example embodiment will be described in further detail.

Example of Functional Configuration

Figure 2:
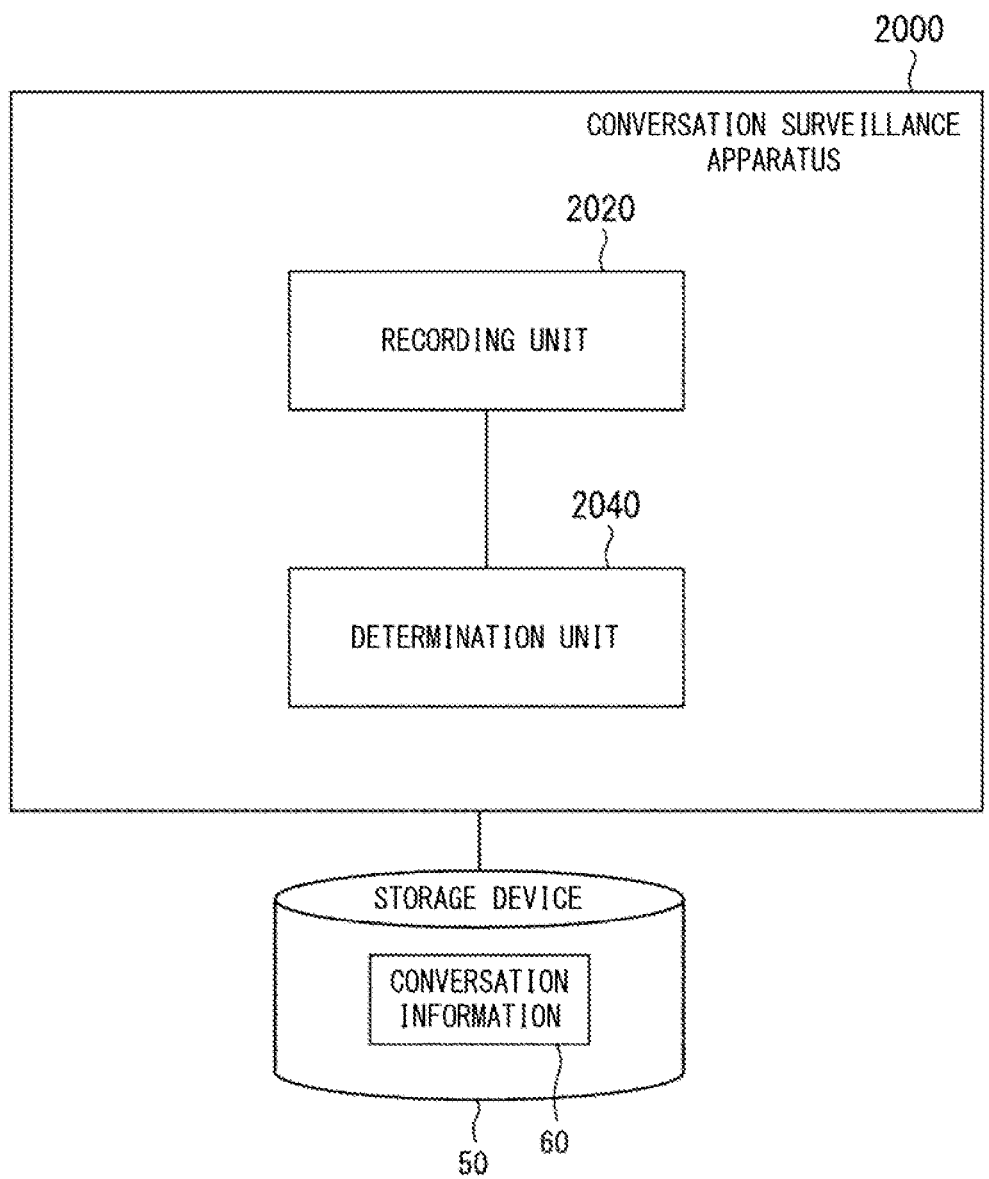
FIG. 2 is a diagram illustrating a functional configuration of the conversation surveillance apparatus.

FIG. 2 is a diagram illustrating a functional configuration of the conversation surveillance apparatus 2000. The conversation surveillance apparatus 2000 includes a recording unit 2020 and a determination unit 2040. The recording unit 2020 detects the human group 40 having a conversation within a predetermined distance using the video data 32. The recording unit 2020 determines the conversation duration for the detected human group 40. The recording unit 2020 puts conversation information 60 in which the determined conversation duration is indicated in association with the identification information of the human group 40 into a storage device 50. The determination unit 2040 computes the total duration of a plurality of conversations in the human group 40 using the conversation information 60 and determines whether or not the total duration is equal to or larger than a threshold.

Example of Hardware Configuration

Each functional configuration unit of the conversation surveillance apparatus 2000 may be implemented with hardware (e.g., a hardwired electronic circuit) that implements each functional configuration unit or by a combination of hardware with software (e.g., a combination of an electronic circuit with a program that controls the electronic circuit). Hereinafter, a case in which each functional configuration unit of the conversation surveillance apparatus 2000 is implemented with a combination of hardware with software will be further described.

Figure 3:
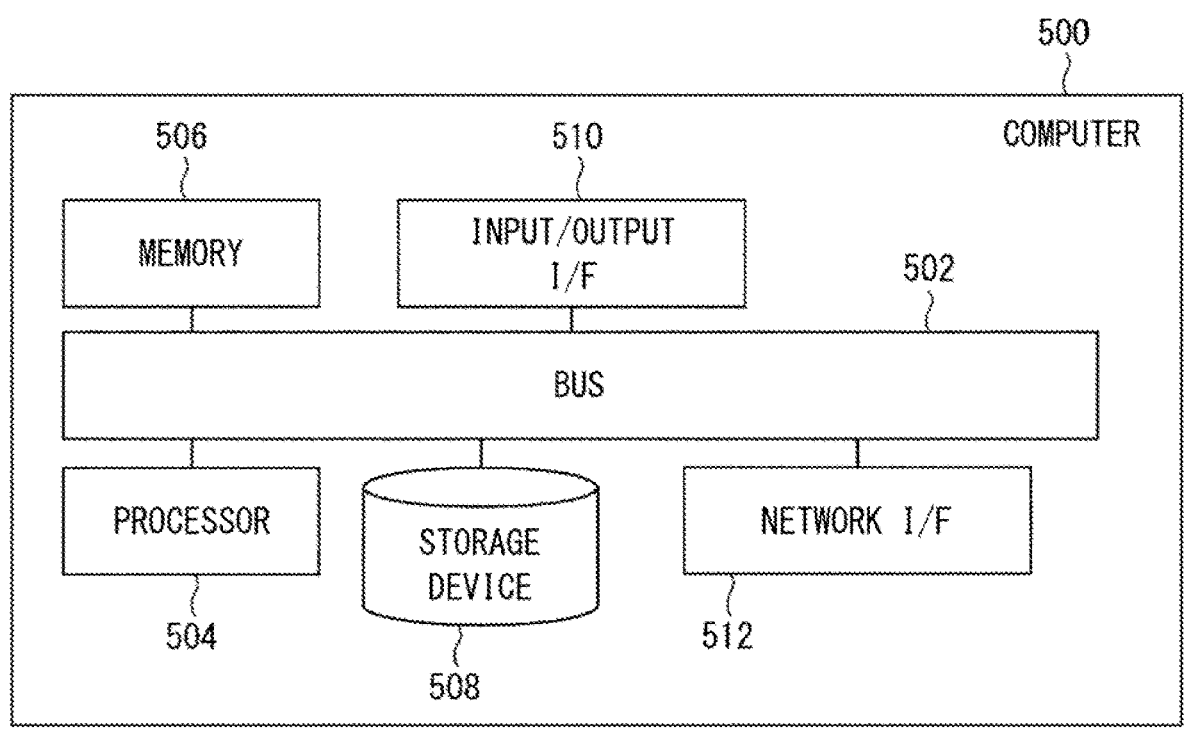
FIG. 3 is a block diagram illustrating a hardware configuration of a computer that implements the conversation surveillance apparatus.

FIG. 3 is a block diagram illustrating a hardware configuration of a computer 500 that implements the conversation surveillance apparatus 2000. The computer 500 may be any type of computer. The computer 500 is, for example, a stationary computer such as a Personal Computer (PC) or a server machine. In another example, the computer 500 may be a portable computer such as a smartphone or a tablet terminal. In another example, the computer 500 may be a controller embedded in the mobile robot (a controller 600 that will be described later). In this case, the conversation surveillance apparatus 2000 is implemented as a mobile robot (i.e., the mobile robot has a function as the conversation surveillance apparatus 2000 as well). The computer 500 may be a special-purpose computer that is designed to implement the conversation surveillance apparatus 2000 or may be a general-purpose computer.

For example, by installing a specific application in the computer 500, each function of the conversation surveillance apparatus 2000 is implemented in the computer 500.

The above application is formed of a program for implementing a functional configuration unit of the conversation surveillance apparatus 2000.

The computer 500 includes a bus 502, a processor 504, a memory 506, a storage device 508, an input/output interface 510, and a network interface 512. The bus 502 is a data transmission path for enabling the processor 504, the memory 506, the storage device 508, the input/output interface 510, and the network interface 512 to transmit and receive data among them. However, the method for connecting the processor 504 and the like to one another is not limited to the bus connection.

The processor 504 may be any type of processor such as a Central Processing Unit (CPU), a Graphics Processing Unit (GPU), or a Field-Programmable Gate Array (FPGA). The memory 506 is a main memory unit that is implemented using a Random Access Memory (RAM) or the like. The storage device 508 is an auxiliary storage device that is implemented with a hard disk, a Solid State Drive (SSD), a memory card, or a Read Only Memory (ROM).

The input/output interface 510 is an interface for connecting the computer 500 with an input/output device. An input device such as a keyboard and an output device such as a display device are connected, for example, to the input/output interface 510.

The network interface 512 is an interface for connecting the computer 500 to a wireless network. This network may be a Local Area Network (LAN) or a Wide Area Network (WAN). For example, the computer 500 is connected to a mobile robot 20 via the network interface 512 and the wireless network in such a way that the computer 500 is able to communicate with the mobile robot 20.

The storage device 508 stores a program for implementing each functional configuration unit of the conversation surveillance apparatus 2000 (a program for implementing the above-mentioned application). The processor 504 loads this program into the memory 506 to execute the loaded program, thereby implementing each functional configuration unit of the conversation surveillance apparatus 2000.

Further, the storage device 508 may store the conversation information 60. In this case, the storage device 50 is implemented with the storage device 508. The storage device 50 may instead be implemented with a storage device other than the storage device 508 (e.g., a storage device provided outside the computer 500).

The conversation surveillance apparatus 2000 may be implemented with one computer 500 or may be implemented with a plurality of computers 500. In the latter case, the configurations of the computers 500 are not required to be the same as each other, and may be different from each other.

Further, a plurality of conversation surveillance apparatuses 2000 may be provided for one surveillance area. For example, a plurality of mobile robots are introduced in one surveillance area and each of these mobile robots operates as the conversation surveillance apparatus 2000.

Alternatively, only the recording unit 2020 may be implemented in each of the plurality of mobile robots and the determination unit 2040 may be implemented with another computer (e.g., server apparatus). In this case, for example, each of the plurality of mobile robots detects a human group 40 while performing patrol in a surveillance area and puts the conversation duration in the detected human group 40 into the storage device 50. Then, the server apparatus aggregates the conversation durations collected using the mobile robots for each human group 40 and compares the aggregated conversation duration with a threshold.

Example of Hardware Configuration of Mobile Robot

Figure 4:
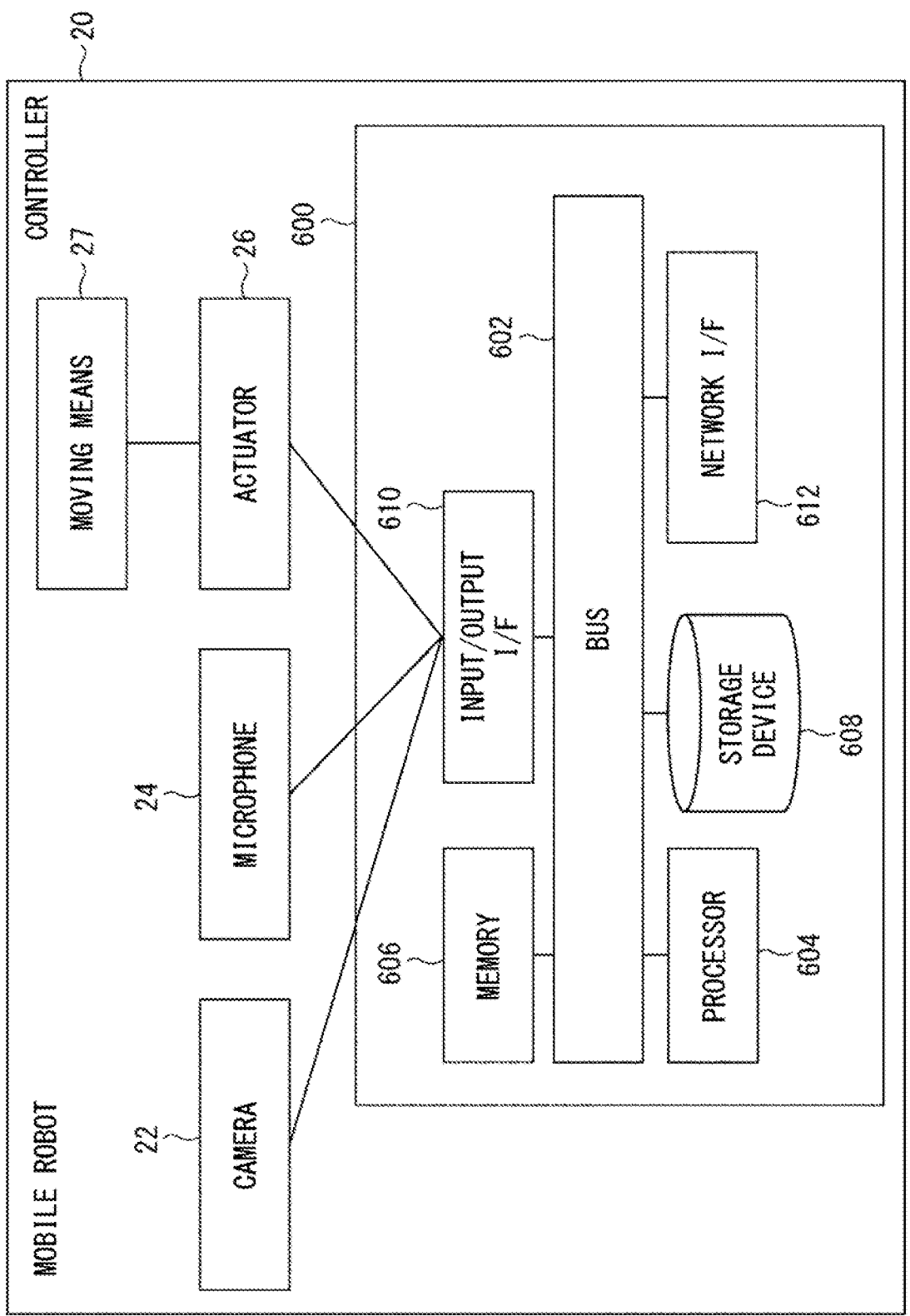
FIG. 4 is a block diagram illustrating a hardware configuration of a mobile robot.

FIG. 4 is a block diagram illustrating a hardware configuration of the mobile robot. The mobile robot 20 includes a camera 22, a microphone 24, an actuator 26, a moving means 27, and a controller 600. The mobile robot 20 moves by the moving means 27 operating in response to output of the actuator 26. The moving means 27 is, for example, means such as wheels for achieving running. In this case, the mobile robot 20 runs to travel in the surveillance area. In another example, the moving means 27 may be means such as a propeller for achieving flying. In this case, the mobile robot 20 flies within the surveillance area. The output of the actuator 26 is controlled by the controller 600.

The controller 600 is any type of computer and is implemented, for example, by an integrated circuit such as a System on a Chip (SoC) or a System in a Package (SiP). In another example, the controller 600 may be implemented with a mobile terminal such as a smartphone. The controller 600 includes a bus 602, a processor 604, a memory 606, a storage device 608, an input/output interface 610, and a network interface 612. The bus 602, the processor 604, the memory 606, the storage device 608, the input/output interface 610, and the network interface 612 include functions similar to those of the bus 502, the processor 504, the memory 506, the storage device 508, the input/output interface 510, and the network interface 512, respectively.

<Flow of Process>

Figure 5:
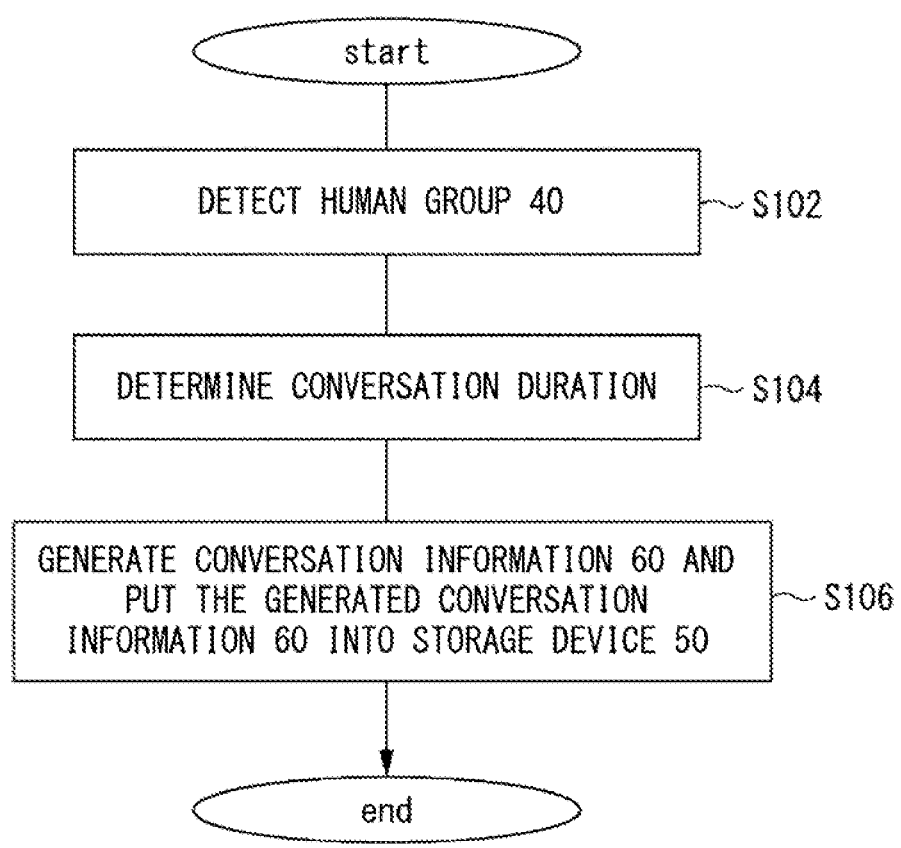
FIG. 5 is a first flowchart illustrating a flow of process executed by the conversation surveillance apparatus according to the first example embodiment.

FIG. 5 is first flowchart illustrating a flow of process executed by the conversation surveillance apparatus 2000 according to the first example embodiment. The recording unit 2020 detects a human group 40 (a plurality of persons who are having a conversation within a predetermined distance) using video data 32 (S102). The recording unit 2020 determines the conversation duration for the human group 40 (S104). The recording unit 2020 generates conversation information 60 indicating identification information of the human group 40 and the conversation duration, and puts the generated conversation information 60 into the storage device 50 (S106).

Figure 6:
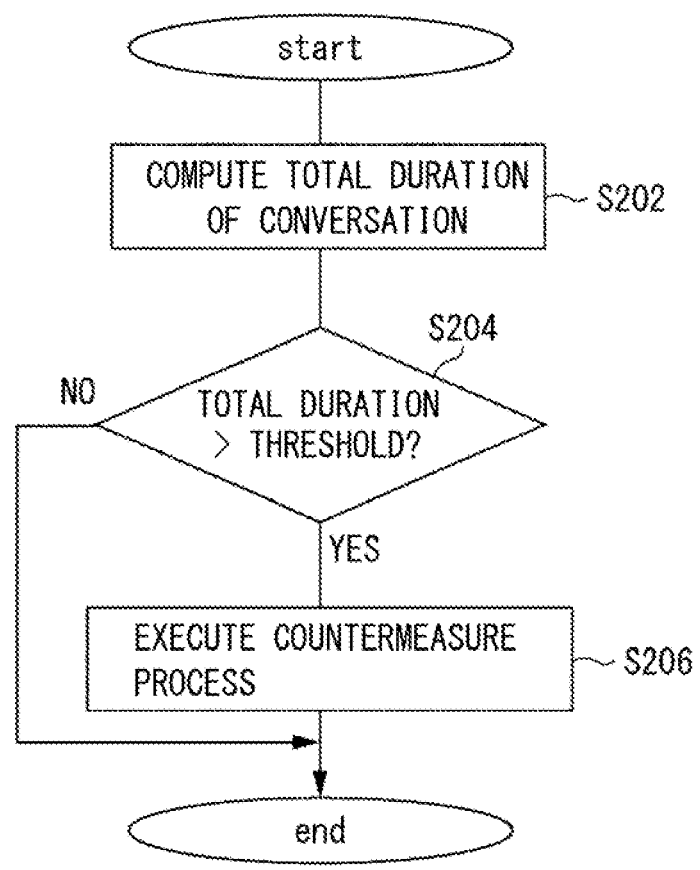
FIG. 6 is a second flowchart illustrating a flow of process executed by the conversation surveillance apparatus according to the first example embodiment.

FIG. 6 is a second flowchart illustrating a flow of process executed by the conversation surveillance apparatus 2000 according to the first example embodiment. The determination unit 2040 computes the total duration of a plurality of conversations in the human group 40 within a predetermined period of time using the conversation information 60 (S202). The determination unit 2040 determines whether or not the computed total duration is equal to or larger than a threshold (S204). When the total duration is equal to or larger than the threshold (S204: YES), the conversation surveillance apparatus 2000 executes a predetermined countermeasure process (S206). On the other hand, when the total duration is not equal to or larger than the threshold (S204: NO), the process in FIG. 6 is ended.

<Detection of Human Group 40: S102>

The recording unit 2020 detects a plurality of persons 10 from video data, and determines whether the respective distances between the persons 10 are equal to or smaller than a predetermined distance L1, thereby detecting these persons 10 as a human group 40.

Here, there are various methods for determining that the distances between the persons 10 are equal to or smaller than the predetermined distance L1. For example, the recording unit 2020 analyzes the video data 32 and detects a plurality of persons 10 from the video data 32. After the plurality of persons 10 are detected, the recording unit 2020 controls a projector to project an image indicating a specific distance (hereinafter, referred to as a distance image) onto the ground. Here, the distance image is projected onto a position so that both the plurality of persons 10 that have been detected and the distance image can be included in a capturing range of the camera 30. The distance indicated by the distance image is, for example, the above-mentioned predetermined distance L1. The projector may be installed in a fixed place (e.g., the ceiling) or may be mounted on the mobile robot.

The recording unit 2020 detects the plurality of persons 10 and the distance image from the video data generated by the camera 30 after the distance image is projected, and compares the distances between the persons 10 with the size of the distance image (i.e., the predetermined distance L1 on the image). When the distances between the persons 10 are smaller than the size of the distance image, the recording unit 2020 detects these persons 10 as the human group 40.

The method for determining that the distance between the persons 10 is less than or equal to the predetermined distance L1 is not limited to the above-mentioned method and other existing techniques may be used.

<Determination of Conversation Duration for Human Group 40: S104>

The recording unit 2020 determines, for the human group 40 detected from the video data 32, the conversation duration (S104). To do so, the recording unit 2020 detects the start and the end of the conversation for the human group 40. The start and the end of the conversation may be detected using the video data 32 or using data other than the video data 32. In the following, a case in which the start and the end of the conversation are detected using the video data 32 will be described first and then a case in which data other than the video data 32 is used will be described as well. The details of the method for determining the presence of a conversation (a method for determining whether the video frame or the like represents a human group 40 having a conversation or a human group 40 not having a conversation) will be described later.

For example, the recording unit 2020 analyzes video frames forming the video data 32 in ascending order of the time of the generation, thereby detecting a video frame representing the human group 40 having a conversation. Then, the recording unit 2020 determines the time of the generation of that video frame as the start time of the conversation.

The recording unit 2020 further detects a video frame representing the human group 40 not having a conversation, from the video frames that are generated after the start time of the conversation and included in the video frames forming the video data 32. Then, the recording unit 2020 determines the time of the generation of that video frame as the end time of the conversation.

As will be described later, when the presence of the conversation is determined based on the movement of each person 10, the presence of the conversation may be determined using a video frame sequence (a set of a plurality of video frames that are continuous in time series) instead of using one video frame. In this case, the recording unit 2020 detects a video frame sequence indicating the human group 40 having a conversation, thereby detecting the start of the conversation. In this case, the recording unit 2020 determines the start time of the conversation based on the time of the generation of a video frame included in this video frame sequence. For example, the recording unit 2020 determines the time of the generation of the first video frame (the video frame generated at the earliest time) of the above video frame sequence as the start time of the conversation. When video data is divided into video frame sequences, video frame sequences that are adjacent to each other in time series may partially overlap each other.

Likewise, the recording unit 2020 detects the end of the conversation by detecting the video frame sequence representing the human group 40 not having a conversation. In this case, the recording unit 2020 determines the end time of the conversation based on the time of the generation of a video frame included in this video frame sequence. For example, the recording unit 2020 determines the time of the generation of the last video frame (the video frame generated at the latest timing) of the above video frame sequence as the end time of the conversation.

Further, when the recording unit 2020 detects the start of the conversation, the recording unit 2020 may determine that the conversation has started only when a state in which the human group 40 is having the conversation has continued for a certain period of time. For example, the recording unit 2020 determines that the conversation has started in the human group 40 when a predetermined number or more of video frames or video frame sequences that represent the human group 40 having the conversation are consecutively detected. On the other hand, even when video frames or video frame sequences that represent the human group 40 having the conversation are detected, if the number of video frames or video frame sequences consecutively detected is smaller than a predetermined number, the recording unit 2020 determines that the conversation has not started in the human group 40.

Likewise, when the recording unit 2020 detects the end of the conversation, the recording unit 2020 may determine that the conversation has ended only when a state in which the human group 40 is not having a conversation has continued for a certain period of time. For example, the recording unit 2020 determines that the conversation in the human group 40 has ended when a predetermined number or more of video frames or video frame sequences that represent the human group 40 not having a conversation are consecutively detected. On the other hand, even when video frames or video frame sequences that represent the human group 40 not having a conversation are detected, if the number of video frames or video frame sequences consecutively detected is smaller than a predetermined number, the recording unit 2020 determines that the conversation has not ended in the human group 40.

When the start and the end of the conversation are detected using data other than the video data 32, the recording unit 2020 uses, for example, video data 23 (not shown) obtained from the camera 22 provided in the mobile robot 20 or audio data 25 (not shown) obtained from the microphone 24 provided in the mobile robot 20. Here, the method for detecting the start and the end of the conversation using the video data 23 is similar to the method for detecting the start and the end of the conversation using the video data 32.

When the audio data 25 is used, the recording unit 2020 divides the audio data 25 into a plurality of audio frames and analyzes the audio frames in ascending order of the time of the generation. The recording unit 2020 detects the audio frame representing the human group 40 having a conversation, thereby detecting the start of the conversation. In this case, for example, the recording unit 2020 determines the start time of the audio frame as the start time of the conversation. When the audio data is divided into audio frames, audio frames that are adjacent to each other in time series may partially overlap each other.

Likewise, the recording unit 2020 detects the end of the conversation by detecting the audio frame representing the human group 40 not having a conversation from the audio frames that are generated after the start time of the conversation. In this case, for example, the recording unit 2020 determines the time of the generation of that audio frame as the end time of the conversation.

<Method for Determining Presence of Conversation>

The recording unit 2020 determines which is represented by each video frame or the like, the state in which the human group 40 is having the conversation or the state in which the human group 40 is not having a conversation. In the following, a method for the determination using the video data and a method for the determination using the audio data will be illustrated.

<<Method for Determining Presence of Conversation for Video Data>>

<<<Determination Based on Mouth Movement>>>

For example, the recording unit 2020 determines, for each of the video frame sequences obtained from the video data, whether or not each of the persons 10 included in the human group 40 is moving his/her mouth. For example, if any one of the plurality of persons 10 included in the human group 40 is moving his/her mouth in the video frame sequence, the recording unit 2020 determines that this video frame sequence represents the human group 40 having a conversation. On the other hand, when none of the persons 10 included in the human group 40 is moving his/her mouth in the video frame sequence, the recording unit 2020 determines that this video frame sequence represents the human group 40 not having a conversation.

Note that the recording unit 2020 may determine that a conversation is taking place by only persons 10 who are moving their mouths among the plurality of persons 10 included in the human group 40. In this case, when a video frame sequence in which some of the persons 10 included in the human group 40 are moving their mouths has been detected, the recording unit 2020 may exclude persons 10 who are not moving their mouths from the human group 40 and determine that this video frame sequence represents the human group 40 having the conversation. In this case, however, if there is only one person 10 who is moving his/her mouth, it is determined that the human group 40 not having a conversation.

There are various methods for determining if there is a movement of the mouth from the video frame sequence. For example, the recording unit 2020 extracts an image region representing the mouth of a person 10 and its surroundings from each video frame included in the video frame sequence, and computes both the probability that the person 10 is moving his/her mouth and the probability that the person 10 is not moving his/her mouth using time-series data of the image region. Then, when the probability that the person 10 is moving his/her mouth is equal to or larger than the probability that the person 10 is not moving his/her mouth, the recording unit 2020 determines that the person 10 is moving his/her mouth. On the other hand, when the probability that the person 10 is moving his/her mouth is smaller than the probability that the person 10 is not moving his/her mouth, the recording unit 2020 determines that the person 10 is not moving his/her mouth.

In another example, the recording unit 2020 may compute the probability that the person 10 is moving his/her mouth and determine that the person 10 is moving his/her mouth when this probability is equal to or larger than a threshold. In this case, when this probability is smaller than the threshold, the recording unit 2020 determines that the person 10 is not moving his/her mouth.

<<<Determination Based on Direction of Face or Line-of-Sight>>>

For example, the recording unit 2020 determines, for each video frame, the presence of a conversation based on the direction of the face or the line-of-sight of each of the persons 10 included in the human group 40. Hereinafter, a case in which the face direction is used will be described in further detail. Unless otherwise stated, "face" is replaced by "line-of-sight" in the following explanation for a case in which the direction of the line-of-sight is used.

For example, for each video frame obtained from the video data, when each of the persons 10 included in the human group 40 is facing another person 10 included in the human group 40, the recording unit 2020 determines that the video frame represents that all the persons 10 included in the human group 40 are having a conversation. On the other hand, when none of the respective persons included in the human group 40 is facing any persons 10 included in the human group 40, the recording unit 2020 determines that the video frame indicates that the human group 40 is not having a conversation.

The recording unit 2020 may determine that a conversation is taking place by only persons 10, among the plurality of persons 10 included in the human group 40, who are facing another person 10 included in the human group 40. In this case, the recording unit 2020 excludes persons 10 who are not determined to be facing any persons 10 included in the human group 40 from the human group 40. Specifically, when two or more persons who are facing another person 10 are detected from the video frame, the recording unit 2020 excludes persons 10 who are not facing any persons 10 from the human group 40 and then determines that the video frame represents that the human group 40 is having the conversation. On the other hand, when two or more persons 10 who are facing another person 10 are not detected from the video frame, the recording unit 2020 determines that this video frame represents that the human group 40 is not having a conversation.

There are various methods for determining the face directions of persons included in the video frame. For example, the recording unit 2020 extracts an image region representing the face of a person 10 from the video frame. Further, the recording unit 2020 computes, for each of a plurality of directions (e.g., predetermined four directions or predetermined eight directions), the probability that the person 10 is facing that direction using the extracted image region. The recording unit 2020 then determines the direction with the highest computed probability among the plurality of directions as the direction of the face of the person 10.

<<<Method for Using Discriminator>>>

The recording unit 2020 may include a discriminator that determines the presence of a conversation in accordance with input of a video frame sequence including the faces of a plurality of persons 10. For example, in response to an input of a video frame sequence including the faces of the plurality of persons 10, this discriminator outputs one of the result of the determination that "conversation is taking place" and the result of the determination that "conversation is not taking place" for these plurality of persons 10. This discriminator may be implemented with, for example, a recurrent neural network (RNN).

For example, the discriminator computes both the probability that a conversation is taking place and the probability that a conversation is not taking place, and outputs the result with higher probability than the other one as the result of the determination.

Note that the discriminator is trained in advance using training data formed of a combination of "a video frame sequence and a ground-truth label (a label indicating whether or not conversation is taking place)". Various existing techniques may be used as the technique for training the discriminator using training data formed of a combination of input data with a ground-truth label.

<<Method for Determining Presence of Conversation for Audio Data>>

For example, for each audio frame, the recording unit 2020 determines the presence of a conversation based on the relation between the volume of the sound included in the audio frame and the distance to the human group 40. For example, a function that defines the relation between the distance from the microphone 24 to the human group 40 and a threshold is defined in advance. For the time at which the audio frame is obtained from the microphone 24, the recording unit 2020 determines the distance from the mobile robot 20 to the human group 40, determines the threshold by inputting this distance into the above-mentioned function, and compares the volume of the sound represented by the audio frame with the determined threshold. When the volume of the sound is equal to or larger than the threshold, the recording unit 2020 determines that the audio frame represents that the human group 40 is having the conversation. On the other hand, when the volume of the sound is smaller than the threshold, the recording unit 2020 determines that the audio frame represents that the human group 40 is not having a conversation.

The recording unit 2020 may analyze the audio frame and determine whether or not the sound includes human voices. In this case, the recording unit 2020 determines that the audio frame indicates that the human group 40 is having the conversation when the volume of the sound represented by the audio frame is equal to or larger than a threshold and this sound includes human voices. On the other hand, when the volume of the sound is smaller than the threshold or this sound does not include human voices, the recording unit 2020 determines that this audio frame represents that the human group 40 is not having a conversation. Accordingly, for example, it is possible to avoid falsely detecting a situation in which sounds other than human voices are provided as the situation in which the human group 40 is having the conversation.

Note that the recording unit 2020 may take into account the number of persons whose voices are included in the audio frame. For example, when the volume of the sound represented by the audio frame is equal to or larger than the threshold and this sound includes voices of a plurality of persons, the recording unit 2020 determines that this audio frame represents that the human group 40 is having a conversation. On the other hand, when the volume of the sound is smaller than the threshold or the number of persons whose voices are included in the sound is one or none, the recording unit 2020 determines that this audio frame represents that the human group 40 is not having a conversation. Accordingly, for example, it is possible to avoid falsely detecting a situation where one person is talking to himself/herself as a situation in which the human group 40 is having a conversation.

As another example, the recording unit 2020 may include a discriminator that determines whether or not an audio frame includes sounds of a plurality of persons 10 who are having a conversation in accordance with input of this audio frame. This discriminator outputs, for example, one of the result of the determination that "conversation is taking place" and the result of the determination that "conversation is not taking place" in response to the input of the audio frame. This discriminator may be implemented with, for example, a recurrent neural network (RNN).

It is noted that the above-mentioned discriminator is trained in advance using training data formed of a combination of "audio data and a ground-truth label (a label indicating whether or not conversation is taking place)". As described above, existing techniques may be used as the technique for training the discriminator using the training data.

<Regarding Conversation Information 60>

The conversation information 60 is information in which the identification information of the human group 40 is associated with the conversation duration of the human group 40. Further, the conversation information 60 also includes information by which the time when the conversation occurs can be determined.

FIG. 7 is a diagram illustrating a configuration of the conversation information 60 in a form of a table. In FIG. 7, the conversation information 60 includes group identification information 62 and time information 64. The group identification information 62 indicates the identification information of the human group 40. The identification information of the human group 40 indicates a combination of identification information of each of the persons 10 included in the human group 40 (e.g., information in which identification information items of each of the persons 10 are listed). The time information 64 indicates, for example, the start time of the conversation and the conversation duration. In another example, the time information 64 may indicate the start time and the end time of the conversation. In this case, the conversation duration may be computed as the difference between the start time of the conversation and the end time of the conversation.

The recording unit 2020 determines the conversation duration of the human group 40 using the above-mentioned method, then generates the conversation information 60 for the human group 40, and puts the generated conversation information 60 into the storage device 50.

<Comparison Between Total Duration of Conversation and Threshold: S202 and S204>

The determination unit 2040 computes, for the human group 40, the total duration of the conversations held within a predetermined period of time (S202), and determines whether or not this total duration is equal to or larger than a threshold (S204). Here, the total duration of the conversations may be computed taking into account only the conversation already ended or may be computed taking into account the conversation currently taking place as well. Hereinafter, each of these cases will be described.

<<Case in which Only Conversation Already Ended is Taken into Account>>

For example, the recording unit 2020 computes the total duration of the conversations for each of a plurality of human groups 40 at a specific timing. When, for example, the predetermined period of time is one day (the same day), the recording unit 2020 computes the total duration of the conversations held on this day for each of the human groups 40 once a day. Specifically, the recording unit 2020 acquires, from the conversation information 60 stored in the storage device 50, conversation information 60 of only a conversation held within a predetermined period of time. Further, the recording unit 2020 classifies the acquired conversation information 60 for each human group 40 (i.e., for each of conversation information 60 whose values of the group identification information 62 are the same). Then, for each human group 40, the recording unit 2020 sums up the conversation duration determined with the conversation information 60 regarding this human group 40, thereby computing the total duration of the conversations.

For each of the human groups 40, the recording unit 2020 determines whether or not the total duration of the conversations computed for the human group 40 is equal to or larger than a threshold. Accordingly, the recording unit 2020 can determine the human group 40 whose total duration of the conversations in the human group 40 within a predetermined period of time is equal to or larger than the threshold, from the plurality of human groups 40.

However, the human groups 40 to be handled may not be all the human groups 40. For example, the conversation surveillance apparatus 2000 may receive a user operation for specifying a human group 40 and determine whether or not the total duration of the conversations in this human group 40 within a predetermined period of time is equal to or larger than the threshold only for the human group 40 specified by the user operation.

<<Case in which Conversation Currently Taking Place is Taken into Account>>

In this case, the determination unit 2040 determines whether or not the total duration of the conversations already ended and the conversation currently taking place has become equal to or larger than a threshold. It is based on the assumption that it is detected by the recording unit 2020 that a conversation in a human group 40 is continuing (the start of the conversation has already been detected but the end of the conversation has not yet been detected).

For example, when the start of the conversation of a human group 40 has been detected by the recording unit 2020, the determination unit 2040 acquires conversation information 60 whose group identification information 62 indicates the identification information of that human group 40 and which indicates the conversation duration regarding the conversation held within a predetermined period of time. For example, when the predetermined period of time is one day and the current date is Jun. 15, 2020, the determination unit 2040 acquires the conversation information 60 indicating the conversation duration regarding the conversation held on Jun. 15, 2020.

The determination unit 2040 first sums up the conversation duration indicated by the acquired conversation information 60, thereby computing the total duration of the past conversation held within a predetermined period of time for the human group 40. When this total duration is equal to or larger than a threshold, the determination unit 2040 determines that the total duration of the conversations held within a predetermined period of time is equal to or larger than the threshold. On the other hand, when the total duration is smaller than the threshold, the determination unit 2040 repeatedly determines, while counting the duration of the conversation currently taking place, whether the sum of the total duration of the past conversation and the duration of the current conversation that has been counted (i.e., the total duration of the past and current conversations) is equal to or larger than a threshold. Then, when the total duration of the past and current conversations becomes equal to or larger than the threshold, the determination unit 2040 determines that the total duration of the conversations is equal to or larger than the threshold. For example, the above determination is repeated at predetermined time intervals (e.g., every minute).

Alternatively, instead of repeatedly making the aforementioned determination, the determination unit 2040 may compute the sum of the total duration of the past conversation and the duration of the current conversation at a timing when the end of the conversation that is currently taking place has been detected, and compare this sum with the threshold.

By taking into account the duration of the current conversation as well, it is possible to detect a human group 40 whose total duration of the conversations held within a predetermined period of time becomes equal to or larger than the threshold in real time. When a warning or the like is issued to a human group 40 who are having a conversation in real time as a countermeasure process that will be described later, the duration of the current conversation needs to be taken into account as described above.

<Case being Excluded from Determination of Conversation Duration>

When the human group 40 is having a conversation in a state that meets a predetermined condition, the conversation surveillance apparatus 2000 may exclude the conversation duration thereof from the computation of the total duration of the conversations. The predetermined condition is, for example, a condition that "appropriate measures for preventing infectious diseases are taken". More specific examples may be a condition that "all the persons 10 included in the human group 40 wear masks" or a condition that "a plurality of persons 10 included in the human group 40 are separated from one another by partitions".

Here, a policy that "persons within a close distance are allowed to have a conversation if appropriate measures for preventing infectious diseases are taken" may be employed as a policy for restricting conversation in the surveillance area. Employing the aforementioned condition regarding the prevention of infectious diseases makes it possible to practice this kind of policies. Note that the timing to determine whether or not the aforementioned predetermined condition is met may be before the detection that the human group 40 is having a conversation or may be after this detection.

For example, when the recording unit 2020 detects the start of a conversation held in the human group 40, the recording unit 2020 considers that the conversation has not started if the aforementioned predetermined condition is met. In other words, the recording unit 2020 detects a human group 40 who are having a conversation within a predetermined distance in a state in which the predetermined condition is not met, as a human group 40 who are having a conversation within a predetermined distance.

Note that the recording unit 2020 may distinguish a case in which a predetermined condition is met and a case in which the predetermined condition is not met to compute the conversation duration of the human group 40. In this case, a flag indicating whether the conversation has taken place in the state in which the predetermined condition is met or the conversation has taken place in the state in which the predetermined condition is not met is further provided in the conversation information 60. Accordingly, both the duration of the conversation held in the state in which a predetermined condition is met and the duration of the conversation held in the state in which a predetermined condition is not met may be recorded.

As described above, when both the duration of the conversation held in the state in which a predetermined condition is met and the duration of the conversation held in the state in which a predetermined condition is not met are stored in the storage device 50, the determination unit 2040 computes, for example, the total duration of only the conversation held in the state in which the predetermined condition is not met, and compares this total duration with a threshold. In another example, the determination unit 2040 may correct the duration of the conversation held in the state in which the predetermined condition is met to a value smaller than the actual conversation duration. Specifically, the determination unit 2040 computes both the total duration T1 of conversations held within a predetermined period of time in a state in which a predetermined condition is not met and the total duration T2 of conversations held within a predetermined period of time in the state in which the predetermined condition is met, multiples the latter value by a predetermined coefficient a that is smaller than 1, and then computes T1+a*T2, which is the sum thereof. The conversation surveillance apparatus 2000 then determines whether or not this sum is equal to or larger than the threshold.

<Execution of Countermeasure Process: S206>

When it is determined, for the human group 40, that the total duration of the conversations is equal to or larger than the threshold (S204: YES), the conversation surveillance apparatus 2000 executes a predetermined countermeasure process (S206). Arbitrary process may be employed as the countermeasure process. The countermeasure process is, for example, a process of issuing a warning (hereinafter, referred to as a warning process) for a human group 40 whose total duration of the conversations is determined to be equal to or larger than a threshold. For example, the warning process is performed using the mobile robot 20. Specifically, the warning process is a process for causing a display device provided in the mobile robot 20 to display a warning screen or a process for causing a projector provided in the mobile robot 20 to project a warning image. In another example, the warning process is a process for outputting a warning sound from a speaker provided in the mobile robot 20.

Here, the mobile robot 20 may issue a warning after approaching somewhat close to the human group 40. For example, the conversation surveillance apparatus 2000 may move the mobile robot 20 to a position whose distance from the human group 40 is equal to or smaller than a predetermined threshold, and then various kinds of warnings described above may be output from the mobile robot 20. Various existing techniques may be used as the technique for moving the mobile robot 20 to a desired position.

In another example, the conversation surveillance apparatus 2000 may transmit a warning notification to each of the persons 10 included in the human group 40. In this case, information that associates identification information of each of the persons 10 used for the group identification information 62 (features on an image, audio features of the voice, or the like) with the destination (e.g., an e-mail address) of the notification to be sent to this person 10 is stored in advance in a storage device (e.g., a storage device 50) that can be accessed from the conversation surveillance apparatus 2000. The conversation surveillance apparatus 2000 determines the identification information of each of the persons 10 included in the human group 40 to which a warning is to be issued, and transmits the above-mentioned notification to the destination that correspond to this identification information.

Further, the conversation surveillance apparatus 2000 may issue a warning not only to the human group 40 whose total duration of the conversations is determined to be equal to or larger than the threshold but also to other people. For example, the conversation surveillance apparatus 2000 controls an apparatus that performs broadcasting (indoor broadcasting, in-house broadcasting, outdoor broadcasting, or the like) to cause this apparatus to perform broadcasting to warn people to avoid a long conversation with other people within a close distance or cause this apparatus to emit a predetermined warning sound.

The countermeasure process is not limited to the warning process. For example, the conversation surveillance apparatus 2000 may put information regarding the human group 40 whose total duration of conversations is determined to be equal to or larger than the threshold (identification information or video data in which the human group 40 is being captured) into the storage device. Accordingly, for example, if one of the human groups 40 is found to have contracted an infectious disease, the other persons 10 included in the human group 40 may be determined to be persons who are likely to contract the infectious disease.

Further, the conversation surveillance apparatus 2000 may perform the countermeasure process in multiple stages in accordance with the magnitude of the total duration of the conversations. In this case, information that associates warning processes different from each other with a plurality of respective warning levels is stored in advance in a storage device (e.g., the storage device 50) that can be accessed from the conversation surveillance apparatus 2000. For example, more prominent warnings (having larger effects of warning) are associated with higher warning levels.

In this case, the conversation surveillance apparatus 2000 computes the total duration of the past and current conversations by counting the duration of the current conversation, and repeatedly compares the computed total value with multiple-stage thresholds. Suppose that three thresholds, namely, P1, P2, and P3 (P1<P2<P3) are provided. The conversation surveillance apparatus 2000 performs a first-level warning process of "moving to a position within a predetermined distance from the human group 40" when the total duration of the past and current conversations becomes equal to or larger than P1. Next, when the total duration of the past and current conversations becomes equal to or larger than P2, the conversation surveillance apparatus 2000 performs a second-level warning process of "displaying a warning screen on a display device or projecting a warning image onto the ground". Then, the conversation surveillance apparatus 2000 performs a third-level warning process of "outputting a warning sound from a speaker" when the total duration of the past and current conversations becomes equal to or larger than P3.

By issuing multiple-stage warnings in accordance with the total duration of the conversations as described above, modest warnings may be issued if the total duration of the conversations remains short, and more prominent warnings may be issued as the total duration of the conversations increases. It is therefore possible to maintain a fine balance between the magnitude of the effect of the warning and the degree to which the warning interferes with peoples' actions. That is, as long as the total duration of the conversations remains short, it is possible to issue a warning that disturbs the conversation as little as possible, even though this warning may not be very effective for stopping the conversation. On the other hand, when the total duration of the conversations becomes long, it is possible to issue a warning that has a great effect on stopping the conversation while accepting a disturbance of the conversation to some extent.

<Regarding Control of Mobile Robot 20>

As described above, the camera 22 or the microphone 24 provided in the mobile robot 20 may be used to determine the conversation duration. Here, determining the conversation duration using the camera 22 or the microphone 24 when the camera 30 is a fixed camera is preferable in the case where, for example, it is difficult to determine the conversation duration using the video data 32 obtained from the camera 30. This case includes, for example, a case in which it is impossible to determine the state of the face of each of the persons 10 included in the human group 40 using the video data 32 since each of the persons 10 shows his/her back to the camera 30.

In this case, the conversation surveillance apparatus 2000 preferably controls the mobile robot 20 to move the mobile robot 20 to a place where it is possible to obtain the video data 23 or the audio data 25 with which whether or not the human group 40 is having the conversation can be determined. Hereinafter, the method therefor will be illustrated.

<<Case in which Video Data 23 is Used>>

In a case in which the video data 23 is used, the conversation surveillance apparatus 2000 moves, for each of the persons 10 included in the human group 40, the mobile robot 20 for a position where information that is necessary to determine the mouth movement, the face direction, or the direction of the line-of-sight can be obtained. The pieces of information necessary to determine the mouth movement, the face direction, and the direction of the line-of-sight are an image region including the mouth, an image region including the face, and an image region including the eyes, respectively.

For example, the conversation surveillance apparatus 2000 moves the mobile robot 20 in such a way that the mobile robot 20 approaches the human group 40. In another example, the conversation surveillance apparatus 2000 moves the mobile robot 20 to a position where there is no obstacle between persons 10 included in the human group 40 and the mobile robot 20. Note that existing techniques may be used as a technique for moving the mobile robot so that the mobile robot approaches a specific object included in the video data obtained from the camera mounted on the mobile robot or moving the mobile robot to a position where there is no obstacle between the mobile robot and the specific object.

In order to ensure that the mouth and the eyes of the person 10 are included in the video data 23, it is preferable to move the mobile robot 20 to the front of the face of the person 10. In this case, for example, the conversation surveillance apparatus 2000 computes the face direction of each of the plurality of persons 10 included in the human group 40 and moves the mobile robot 20 to the front of the faces of the plurality of persons 10 in turn. Accordingly, the conversation surveillance apparatus 2000 determines the mouth movement and the direction of the line-of-sight for each of the persons 10 in turn.

In another example, the conversation surveillance apparatus 2000 may move the mobile robot 20 in such a way that the mobile robot 20 can capture the mouths and eyes of a plurality of persons 10 from one place. For example, the conversation surveillance apparatus 2000 computes the average direction of the directions of the faces of the respective persons 10 from the video data 32 or the video data 23, and moves the mobile robot 20 to a position on the average direction.

Suppose that the direction of the face of the person 10 has not been determined from the video data 23 when the mobile robot 20 is moved to the front of the face of the person 10. In this case, the conversation surveillance apparatus 2000 attempts to determine the direction of the face of the person 10 from the video data 23 while causing the mobile robot 20 to approach the human group 40 or causing the mobile robot 20 to move around the human group 40. After the direction of the face of the person 10 is determined, the conversation surveillance apparatus 2000 moves the mobile robot 20 to the front of the face of the person 10.

<<Case in which Audio Data 25 is Used>>

Even when the human group 40 is having a conversation, if the position of the mobile robot 20 is far from the human group 40, it is difficult to detect the sound of the conversation held in the human group 40 by the microphone 24. In order to solve this problem, the conversation surveillance apparatus 2000 moves the mobile robot 20 to a position whose distance from the human group 40 is equal to or smaller than a predetermined distance L2. This predetermined distance L2 is set in advance as a distance where the sound of the conversation can be detected by the microphone 24 when the human group 40 is having the conversation.

<<Regarding Computation of Travel Path>>

In order to move the mobile robot 20 to a specific destination, a travel path to this destination is set using map data that can be referred to by the mobile robot 20. Here, an apparatus that performs processing of computing the travel path to the destination using the map data and setting the computed travel path in the mobile robot 20 is referred to as a path setting apparatus. The path setting apparatus may be the mobile robot 20, the conversation surveillance apparatus 2000, or another apparatus.

The path setting apparatus acquires map data of the surveillance area, and computes the travel path of the mobile robot 20 based on the map data and the destination (the position to which the mobile robot 20 should be moved) that has been determined by the aforementioned various methods. The path setting apparatus then sets the computed travel path in the mobile robot 20. The mobile robot 20 moves in accordance with the set travel path. When the path setting apparatus is an apparatus other than the conversation surveillance apparatus 2000, the conversation surveillance apparatus 2000 provides information indicating the destination that should be set in the mobile robot 20 for the path setting apparatus.

Any existing technique may be used as a technique for computing the travel path based on the map data and the information on the destination.

<<Other Matters Regarding Movement Control>>

The mobile robot 20 preferably moves in such a manner that it does not interfere with actions of people who are in the surveillance area. For example, the mobile robot 20 grasps the movement of each person who is in the surveillance area using the video data 32 or the video data 23, and moves in such a way that the mobile robot 20 does not contact each of the persons. Various existing techniques (e.g., techniques for moving self-driving vehicles in such a way that they do not collide with other vehicles, passersby, etc.) may be employed as a technique for moving the mobile robot 20 while avoiding contact with people.

In another example, the mobile robot 20 preferably moves out of sight of persons who are not included in the human group 40. For example, if a person who is not included in the human group 40 is detected from the video data 23, the path setting apparatus determines the direction of the face or the direction of the line-of-sight of this person 10. The path setting apparatus then computes a travel path for causing the mobile robot 20 to reach the destination while being out of sight of the person 10 based on the direction of the face or the direction of the line-of-sight that has been determined and the destination of the mobile robot 20, and sets this travel path in the mobile robot 20.

However, it may be difficult to move the mobile robot 20 with being out of the sight of the person 10 when, for example, the direction of the face or the direction of the line-of-sight of the person 10 repeatedly and significantly changes. In this case, for example, the path setting apparatus may detect only a person who is not likely to change the direction of his/her face or the direction of his/her line-of-sight (e.g., a person who is standing still or a person who is sitting on a chair) from the video data and set the travel path of the mobile robot 20 in such a way that the mobile robot 20 moves with being out of sight of the detected person.

The mobile robot 20 may be stationary or moving until it receives control by the conversation surveillance apparatus 2000. In the latter case, for example, a travel path is set in the mobile robot 20 so that it performs patrol in a part or all of the surveillance area. In particular, when the camera 22 is used as the camera 30, it is preferable to cause the mobile robot 20 to perform patrol in the surveillance area so that the human group 40 can be detected in various places in the surveillance area. Hereinafter, a travel path that is set in the mobile robot 20 for patrol may also be referred to as a patrol path.

The patrol path preferably includes an area having a high density of people (i.e., a highly populated area) of the surveillance area. For example, the patrol path is set so as to include only an area having a high density of people of the surveillance area. In another example, the patrol path is set in such a way that the frequency with which it performs patrol in an area having a high density of people is higher than the frequency with which it performs patrol in an area having a low density of people.

Further, when the camera 30 is a camera such as a surveillance camera that is set in a place other than the mobile robot 20 in a fixed manner, the patrol path of the mobile robot 20 preferably includes an area that is not included in the capturing range of the camera 30 (hereinafter this area will be referred to as an out-of-focus area). Accordingly, it is possible to cause the mobile robot 20 to capture an area that is difficult for the fixed camera to capture, whereby the surveillance area can be monitored broadly.

The patrol path may be manually set or may be automatically set by the path setting apparatus. In the latter case, for example, the path setting apparatus determines the out-of-focus area for the camera 30 by analyzing the video data 32, and generates a patrol path including this out-of-focus area. More specifically, the path setting apparatus determines the area in the capturing range of the camera 30 using map data of the surveillance area and the video data 32 and determines the area other than the determined area as the out-of-focus area.

Suppose that the out-of-focus area is a closed area. In this case, the path setting apparatus generates the patrol path in such a way that the patrol is performed inside the out-of-focus area. On the other hand, suppose that the out-of-focus area is a plurality of areas that are not connected to each other. In this case, for example, the path setting apparatus generates the patrol path in such a way that the patrol is performed in these plurality of out-of-focus areas in turn. When a plurality of mobile robots 20 are provided in the surveillance area, patrol paths that are different from each other may be set for the respective mobile robots 20. In this case, the patrol paths preferably include out-of-focus areas that are different from each other.

While the present application has been described with reference to the example embodiments, the present application is not limited to the aforementioned example embodiments. Various changes that may be understood by one skilled in the art may be made to the configurations and the details of the present application within the scope of the present application.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

(Supplementary Note 1)

1. A conversation surveillance apparatus comprising:
   a recording unit configured to detect a plurality of persons who have a conversation within a predetermined distance in a surveillance area from video data, determine a duration of the conversation had by the plurality of persons, and put the determined duration of the conversation in association with identification information of the plurality of persons into a storage device; and
   a determination unit configured to determine whether or not a total duration of the conversations of the plurality of persons within a predetermined period of time is equal to or larger than a threshold using the information stored in the storage device.

(Supplementary Note 2)

The conversation surveillance apparatus according to Supplementary note 1, wherein the recording unit acquires the video data from each of a plurality of cameras that capture places different from each other in the surveillance area.

(Supplementary Note 3)

The conversation surveillance apparatus according to Supplementary note 1, wherein the recording unit acquires the video data from a camera provided in a mobile robot that moves in the surveillance area.

(Supplementary Note 4)

The conversation surveillance apparatus according to any one of Supplementary notes 1 to 3,
   wherein the recording unit determines the duration of the conversation had by the plurality of persons using video data generated by the camera provided in the mobile robot that moves in the surveillance area, and
   wherein the identification information of the plurality of persons is defined using image features of a face of each of the plurality of persons.

(Supplementary Note 5)

The conversation surveillance apparatus according to any one of Supplementary notes 1 to 3,
   wherein the recording unit determines the duration of the conversation had by the plurality of persons using audio data generated by a microphone provided in the mobile robot that moves in the surveillance area, and wherein the identification information of the plurality of persons is defined using sound features of a voice of each of the plurality of persons.

(Supplementary Note 6)

The conversation surveillance apparatus according to any one of Supplementary notes 1 to 5, wherein the determination unit acquires a plurality of the durations of the conversations associated with the identification information of the plurality of persons from the storage device, and determines whether or not a sum of the acquired durations of the conversations is equal to or larger than the threshold.

(Supplementary Note 7)

The conversation surveillance apparatus according to any one of Supplementary notes 1 to 5, wherein the determination unit computes a sum of a duration of a conversation that the plurality of persons are currently having and one or more durations of the conversations that are stored in the storage device in association with the identification information of the plurality of persons, and determines whether or not the computed sum is equal to or larger than the threshold.

(Supplementary Note 8)

The conversation surveillance apparatus according to any one of Supplementary notes 1 to 7,
wherein the recording unit determines, using video data, whether or not the plurality of persons are taking predetermined measures to prevent an infectious disease, and
wherein the determination unit computes, for the plurality of persons, the total duration of only the conversations that are had in a state in which the predetermined measures are not being taken.

(Supplementary Note 9)

A control method executed by a computer, the control method comprising:
a recording step of detecting a plurality of persons who have a conversation within a predetermined distance in a surveillance area from video data, determining a duration of the conversation had by the plurality of persons, and putting the determined duration of the conversation in association with identification information of the plurality of persons into a storage device; and
a determining step of determining whether or not a total duration of the conversations of the plurality of persons within a predetermined period of time is equal to or larger than a threshold using the information stored in the storage device.

(Supplementary Note 10)

The control method according to Supplementary note 9, wherein, in the recording step, the video data is acquired from each of a plurality of cameras that capture places different from each other in the surveillance area.

(Supplementary Note 11)

The control method according to Supplementary note 9, wherein, in the recording step, the video data is acquired from a camera provided in a mobile robot that moves in the surveillance area.

(Supplementary Note 12)

The control method according to any one of Supplementary notes 9 to 11,
wherein in the recording step, the duration of the conversation had by the plurality of persons is determined using video data generated by a camera provided in a mobile robot that moves in the surveillance area, and
wherein the identification information of the plurality of persons is defined using image features of a face of each of the plurality of persons.

(Supplementary Note 13)

The control method according to any one of Supplementary notes 9 to 11,
wherein in the recording step, the duration of the conversation had by the plurality of persons is determined using audio data generated by a microphone provided in a mobile robot that moves in the surveillance area, and
wherein the identification information of the plurality of persons is defined using sound features of a voice of each of the plurality of persons.

(Supplementary Note 14)

The control method according to any one of Supplementary notes 9 to 13, wherein, in the determining step, a plurality of the durations of the conversations associated with the identification information of the plurality of persons is acquired from the storage device, and it is determined whether or not a sum of the acquired durations of the conversations is equal to or larger than the threshold.

(Supplementary Note 15)

The control method according to any one of Supplementary notes 9 to 13, wherein, in the determining step, a sum of a duration of a conversation that the plurality of persons are currently having and one or more durations of the conversations that are stored in the storage device in association with the identification information of the plurality of persons is computed, and it is determined whether or not the computed sum is equal to or larger than the threshold.

(Supplementary Note 16)

The control method according to any one of Supplementary notes 9 to 15,
wherein in the recording step, it is determined, using video data, whether or not the plurality of persons are taking predetermined measures to prevent an infectious disease, and
wherein in the determining step, the total duration of only the conversations that are had in a state in which the predetermined measures are not being taken is computed for the plurality of persons.

(Supplementary Note 17)

A computer readable medium storing a program, the program causing a computer to execute:
a recording step of detecting a plurality of persons who have a conversation within a predetermined distance in a surveillance area from video data, determining a duration of the conversation had by the plurality of persons, and putting the determined duration of the conversation in association with identification information of the plurality of persons into a storage device; and
a determining step of determining whether or not a total duration of the conversations of the plurality of persons within a predetermined period of time is equal to or larger than a threshold using the information stored in the storage device.

(Supplementary Note 18)

The computer readable medium according to Supplementary note 17, wherein, in the recording step, the video data is acquired from each of a plurality of cameras that capture places difference from each other in the surveillance area.

(Supplementary Note 19)

The computer readable medium according to Supplementary note 17, wherein, in the recording step, the video data is acquired from a camera provided in a mobile robot that moves in the surveillance area.

(Supplementary Note 20)

The computer readable medium according to any one of Supplementary notes 17 to 19, wherein in the recording step, the duration of the conversation had by the plurality of persons is determined using video data generated by a camera provided in a mobile robot that moves in the surveillance area, and wherein the identification information of the plurality of persons is defined using image features of a face of each of the plurality of persons.

(Supplementary Note 21)

The computer readable medium according to any one of Supplementary notes 17 to 19, wherein in the recording step, the duration of the conversation had by the plurality of persons is determined using audio data generated by a microphone provided in a mobile robot that moves in the surveillance area, and wherein the identification information of the plurality of persons is defined using sound features of a voice of each of the plurality of persons.

(Supplementary Note 22)

The computer readable medium according to any one of Supplementary notes 17 to 21, wherein, in the determining step, a plurality of the durations of the conversations associated with the identification information of the plurality of persons is acquired from the storage device, and it is determined whether or not a sum of the acquired durations of the conversations is equal to or larger than the threshold.

(Supplementary Note 23)

The computer readable medium according to any one of Supplementary notes 17 to 21, wherein, in the determining step, a sum of a duration of a conversation that the plurality of persons are currently having and one or more durations of the conversations that are stored in the storage device in association with the identification information of the plurality of persons is computed, and it is determined whether or not the computed sum is equal to or larger than the threshold.

(Supplementary Note 24)

The computer readable medium according to any one of Supplementary notes 17 to 23, wherein in the recording step, it is determined, using video data, whether or not the plurality of persons are taking predetermined measures to prevent an infectious disease, and wherein in the determining step, the total duration of only the conversations that are had in a state in which the predetermined measures are not being taken is computed for the plurality of persons.

REFERENCE SIGNS LIST

10 Person
20 Mobile Robot
22 Camera
23 Video Data
24 Microphone
25 Audio data
26 Actuator
27 Moving Means
30 Camera
32 Video Data
40 Human group
50 Storage device
60 Conversation Information
62 Group Identification Information
64 Time Information
500 Computer
502 Bus
504 Processor
506 Memory
508 Storage Device
510 Input/output Interface
512 Network Interface
600 Controller
602 Bus
604 Processor
606 Memory
608 Storage Device
610 Input/output Interface
612 Network Interface
2000 Conversation Surveillance Apparatus
2020 Recording Unit
2040 Determination Unit

What is claimed is:

1. A conversation surveillance apparatus comprising:
   at least one memory storing instructions; and
   at least one processor that is configured to execute the instructions to:
   detect a plurality of persons who have a conversation within a predetermined distance in a surveillance area from video data;
   perform a first determination to determine a duration of the conversation had by the plurality of persons;
   put the determined duration of the conversation in association with identification information of the plurality of persons into a storage device; and
   perform a second determination to determine whether or not a total duration of the conversations of the plurality of persons within a predetermined period of time is equal to or larger than a threshold using the information stored in the storage device,
   wherein the first determination includes determining the duration of the conversation had by the plurality of persons using audio data generated by a microphone provided in a mobile robot that moves in the surveillance area, and
   wherein the identification information of the plurality of persons is defined using sound features of a voice of each of the plurality of persons; and
   based on the total duration being larger than the threshold, outputting a countermeasure.

2. The conversation surveillance apparatus according to claim 1, wherein the at least one processor is configured to further to acquire the video data from each of a plurality of cameras that capture places different from each other in the surveillance area.

3. The conversation surveillance apparatus according to claim 1, wherein the at least one processor is configured further to acquire the video data from a camera provided in a mobile robot that moves in the surveillance area.

4. The conversation surveillance apparatus according to claim 1,
   wherein the first determination includes determining the duration of the conversation had by the plurality of persons using video data generated by the camera provided in a mobile robot that moves in the surveillance area, and
   wherein the identification information of the plurality of persons is defined using image features of a face of each of the plurality of persons.

5. The conversation surveillance apparatus according to claim 1, wherein the second determination includes: acquiring a plurality of the durations of the conversations associated with the identification information of the plurality of persons from the storage device; and determining whether or not a sum of the acquired durations of the conversations is equal to or larger than the threshold.

6. The conversation surveillance apparatus according to claim 1, wherein the second determination includes: computing a sum of a duration of a conversation that the plurality of persons are currently having and one or more durations of the conversations that are stored in the storage device in association with the identification information of the plurality of persons; and determining whether or not the computed sum is equal to or larger than the threshold.

7. The conversation surveillance apparatus according to claim 1,
wherein the at least one processor is configured further to determine using video data, whether or not the plurality of persons are taking predetermined measures to prevent an infectious disease, and
wherein the second determination includes computing for the plurality of persons, the total duration of only the conversations that are had in a state in which the predetermined measures are not being taken.

8. A control method executed by a computer, the control method comprising:
detecting a plurality of persons who have a conversation within a predetermined distance in a surveillance area from video data;
performing a first determination to determine a duration of the conversation had by the plurality of persons;
putting the determined duration of the conversation in association with identification information of the plurality of persons into a storage device;
performing a second determination to determine whether or not a total duration of the conversations of the plurality of persons within a predetermined period of time is equal to or larger than a threshold using the information stored in the storage device; and
wherein the first determination includes determining the duration of the conversation had by the plurality of persons using audio data generated by a microphone provided in a mobile robot that moves in the surveillance area, and
wherein the identification information of the plurality of persons is defined using sound features of a voice of each of the plurality of persons; and
based on the total duration being larger than the threshold, outputting a countermeasure.

9. A non-transitory computer readable medium storing a program, the program causing a computer to execute:
detecting a plurality of persons who have a conversation within a predetermined distance in a surveillance area from video data;
performing a first determination to determine a duration of the conversation had by the plurality of persons;
putting the determined duration of the conversation in association with identification information of the plurality of persons into a storage device;
performing a second determination to determine whether or not a total duration of the conversations of the plurality of persons within a predetermined period of time is equal to or larger than a threshold using the information stored in the storage device; and
wherein the first determination includes determining the duration of the conversation had by the plurality of persons using audio data generated by a microphone provided in a mobile robot that moves in the surveillance area, and
wherein the identification information of the plurality of persons is defined using sound features of a voice of each of the plurality of persons; and
based on the total duration being larger than the threshold, outputting a countermeasure.

* * * * *